(12) United States Patent
Fukui (10) Patent No.: US 12,092,612 B2
(45) Date of Patent: Sep. 17, 2024

(54) PHOTOACOUSTIC ELEMENT, PHOTOACOUSTIC IMAGING DEVICE, AND PHOTOACOUSTIC ELEMENT MANUFACTURING METHOD

(71) Applicant: TAMRON CO., LTD., Saitama (JP)

(72) Inventor: Shunya Fukui, Saitama (JP)

(73) Assignee: TAMRON CO., LTD., Saitama (JP)

( * ) Notice: Subject to any disclaimer, the term of this patent is extended or adjusted under 35 U.S.C. 154(b) by 303 days.

(21) Appl. No.: 17/640,661

(22) PCT Filed: Aug. 21, 2020

(86) PCT No.: PCT/JP2020/031548
§ 371 (c)(1),
(2) Date: Mar. 4, 2022

(87) PCT Pub. No.: WO2021/059811
PCT Pub. Date: Apr. 1, 2021

(65) Prior Publication Data
US 2022/0334084 A1    Oct. 20, 2022

(30) Foreign Application Priority Data
Sep. 27, 2019   (JP) .................................. 2019-177036

(51) Int. Cl.
*G01N 29/06* (2006.01)
*G01N 29/24* (2006.01)

(52) U.S. Cl.
CPC ......... *G01N 29/06* (2013.01); *G01N 29/2418* (2013.01)

(58) Field of Classification Search
USPC ........................................................ 73/643
See application file for complete search history.

(56) References Cited

U.S. PATENT DOCUMENTS 10,433,733 B2    10/2019  Wang et al.
2017/0232474 A1*  8/2017  Oralkan .................. B81C 3/001
                                                    310/309
2020/0282424 A1*  9/2020  Oralkan ................ B81B 3/0083

FOREIGN PATENT DOCUMENTS

CN    101990417 B  * 11/2013 ........... A61B 5/0086
JP    2011-519281 A    7/2011
(Continued)

OTHER PUBLICATIONS

Oct. 27, 2020, International Search Report issued for related PCT application No. PCT/JP2020/031548.
(Continued)

*Primary Examiner* — Clayton E. LaBalle
*Assistant Examiner* — Warren K Fenwick
(74) *Attorney, Agent, or Firm* — Paratus Law Group, PLLC (57) ABSTRACT

A photoacoustic element which has excellent optical properties and acoustic properties is achieved. The photoacoustic element (1) includes: a metal layer (10); a first member (11) which is bonded to one primary surface of the metal layer (10); and a second member (12) which is bonded to another primary surface of the metal layer (10). The metal layer (10) reflects optical waves and transmits photoacoustic waves stemming from optical waves. Materials of the metal layer (10), the first member (11), and the second member (12) are selected so as to match an acoustic impedance of the metal layer (10) and an acoustic impedance of each of the first member (11) and the second member (12).

13 Claims, 6 Drawing Sheets

(56) References Cited

FOREIGN PATENT DOCUMENTS

| | | | |
|---|---|---|---|
| JP | 2015-004570 A | 1/2015 | |
| JP | 2016049125 A | * 4/2016 | ........... A61B 5/0095 |

OTHER PUBLICATIONS

Oct. 27, 2020, International Search Opinion issued for related PCT application No. PCT/JP2020/031548.

* cited by examiner

PHOTOACOUSTIC ELEMENT, PHOTOACOUSTIC IMAGING DEVICE, AND PHOTOACOUSTIC ELEMENT MANUFACTURING METHOD

CROSS REFERENCE TO PRIOR APPLICATION

This application is a National Stage Patent Application of PCT International Patent Application No. PCT/JP2020/031548 (filed on Aug. 21, 2020) under 35 U.S.C. § 371, which claims priority to Japanese Patent Application No. 2019-177036 (filed on Sep. 27, 2019), which are all hereby incorporated by reference in their entirety.

TECHNICAL FIELD

The present invention relates to a photoacoustic element. In addition, the present invention relates to a photoacoustic imaging device which includes a photoacoustic element. In addition, the present invention relates to a photoacoustic element manufacturing method.

BACKGROUND ART

In recent years, as a technology for performing highly definite imaging of an object (for example, a biological body, an industrial material, or the like), photoacoustic imaging devices have been attracting attention. By using a photoacoustic imaging device, without causing invasion or exposure for the object, a highly definite imaging of an inside of the object can be performed. In addition, using the photoacoustic imaging device facilitates conducting examination more frequently than conventional. In addition, when a small-sized photoacoustic imaging device can be achieved, on-site examination can be instantaneously conducted.

When an object is irradiated with optical waves, the object which has absorbed these optical waves radiates thermoelastic waves which are referred to as photoacoustic waves. In the photoacoustic imaging device, these photoacoustic waves are referenced, thereby performing imaging of the object. Therefore, identification of a substance with a difference in optical absorptance as an index is enabled. In addition, the photoacoustic waves are more hardly scattered than the optical waves. Therefore, imaging of the inside of the object, which is hardly achieved by optical imaging, is enabled.

A method of the photoacoustic imaging is roughly classified into two kinds. A first method is a photoacoustic computer tomography method, and a second method is a photoacoustic microscope method. Furthermore, the photoacoustic microscope method is classified into a photoacoustic microscope method using a focal point of photoacoustic waves and a photoacoustic microscope method using a focal point of optical waves. It can be said that the method of using the focal point of the optical waves is an excellent method since a resolution in accordance with a beam waist diameter of the optical waves radiated to the object can be obtained.

As a literature which discloses the photoacoustic microscope method using the focal point of the optical waves, for example, Patent Literatures 1 to 2 are cited. In a photoacoustic imaging device disclosed in each of these literatures, adopted is a configuration in which by using a photoacoustic element which transmits optical waves and reflects photoacoustic waves, the optical waves are made incident on an object and the photoacoustic waves are made incident on a detector.

CITATION LIST

Patent Literature

Patent Literature 1: Japanese Unexamined Patent Application Publication "JP 2011-519281 A"
Patent Literature 2: Japanese Unexamined Patent Application Publication "JP 2015-4570 A"

SUMMARY OF THE INVENTION

Problems to be Solved by the Invention

However, the conventional photoacoustic imaging device which makes the optical waves incident on the object and makes the photoacoustic waves incident on the detector by using the photoacoustic element which transmits the optical waves and reflects the photoacoustic waves is left with the problems as to both of acoustic properties and optical properties, which should be solved.

Firstly, when the above-mentioned photoacoustic element transmits the optical waves, non-axisymmetric distortion is caused. Such distortion is a factor to reduce a resolution of the photoacoustic imaging device. Secondly, when the above-mentioned photoacoustic element reflects the photoacoustic waves, mode conversion of the photoacoustic waves (a mode conversion from longitudinal waves to lateral waves or from the lateral waves to the longitudinal waves) is caused. Such mode conversion is a factor to reduce an S/N ratio of the photoacoustic waves. In addition, when in order to avoid the reduction in the S/N ratio, a configuration in which the photoacoustic waves are reflected twice is adopted, an increase in a size of the photoacoustic imaging device is caused and since a pathway along which the photoacoustic waves are guided becomes long, an increase in a loss of the photoacoustic waves is caused.

Note that in Patent Literature 1, besides the photoacoustic imaging device having the above-described configuration, disclosed is a photoacoustic imaging device having a configuration in which optical waves are made incident on an object and photoacoustic waves are made incident on a detector by using a photoacoustic element which reflects the optical waves and transmits the photoacoustic waves. The photoacoustic element used therein is constituted of two prisms and a reflective aluminum coating layer which is sandwiched between these two prisms (refer cc paragraph [0039] in Patent Literature 1). In Patent Literature 1, a material of these prisms is not specified. However, in view of the common general knowledge in those days in 2007 in which Patent Literature 1 was laid open, the material of these prisms is presumed to be N-BK7 or quart.

Incidentally, a Poisson ratio of the N-BK7 is approximately 0.206 and a density of the N-BK7 is approximately $2.51 \times 10^3$ kg/m$^3$. In addition, a Poisson ratio of the quart is approximately 0.17 and a density of the quart is approximately $2.2 \times 10^3$ kg/m$^3$. Then, an acoustic impedance of each of the prisms is approximately $12 \times 10^6$ kg/m$^2$s. On the other hand, an acoustic impedance of aluminum is approximately $17 \times 10^6$ kg/m$^2$s. As described above, since there is a large gap between the acoustic impedance of each of the prisms and the impedance of the aluminum, in the photoacoustic element described in Patent Literature 1, reflection of the photoacoustic waves between the prisms and the reflective aluminum coating layer, which cannot be ignored, is caused. Therefore, in a case where the photoacoustic element described in Patent Literature 1 is used, photoacoustic waves having sufficient intensity cannot be detected.

In addition, it is presumed that the photoacoustic element described in Patent Literature 1 is manufactured by bonding the two prisms, whose each surface has the reflective aluminum coating layer formed thereon, by using an adhesive made of resin. Therefore, it is difficult for the photoacoustic element described in Patent Literature 1 to achieve sufficient heat resisting properties and sufficient robustness. In addition, a loss of the photoacoustic waves in an adhesive layer cannot be ignored.

In view of the above-describe problems, one aspect of the present invention has been made, and it is an object thereof is to achieve a photoacoustic element having excellent optical properties and acoustic properties.

Solutions to Problems

A photoacoustic element according to one aspect of the present invention includes: a metal layer; a first member bonded to one primary surface of the metal layer; and a second member bonded to another primary surface of the metal layer, and the metal layer reflects optical waves and transmits photoacoustic waves emitted by an object which has absorbed the optical waves. Materials of the metal layer, the first member, and the second member are selected so as to match an acoustic impedance of the metal layer and an acoustic impedance of each of the first member and the second member.

Effects of the Invention

According to the present invention, a photoacoustic element which has excellent optical properties and acoustic properties can be achieved.

BRIEF DESCRIPTION OF DRAWINGS

FIGS. 6(a) and 6(b) illustrate a photoacoustic element according to a first embodiment.

FIGS. 7(a) and 7(b) illustrate a photoacoustic element according to a second embodiment.

FIGS. 8(a) and 8(b) illustrate a photoacoustic element according to a third embodiment.

FIGS. 9(a) and 9(b) illustrate a photoacoustic element according to a fourth embodiment.

DESCRIPTION OF EMBODIMENTS

1. Photoacoustic Element

Figure 1:
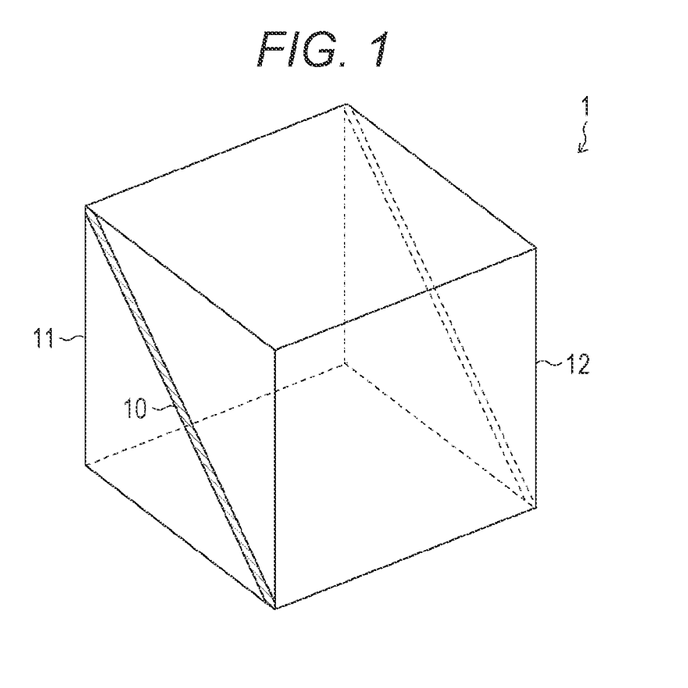
FIG. 1 is a perspective view illustrating a configuration of a photoacoustic element according to one embodiment of the present invention.

With reference to FIG. 1, a configuration of a photoacoustic element 1 according to one embodiment of the present invention will be described. FIG. 1 is a perspective view illustrating the configuration of the photoacoustic element 1.

1.1. Configuration of Photoacoustic Element

The photoacoustic element 1 according to the present embodiment includes a metal layer 10, a first member 11 bonded to one primary surface of the metal layer 10, and a second member 12 bonded to another primary surface of the metal layer 10. The metal layer 10 reflects optical waves and transmits photoacoustic waves emitted by an object which has absorbed these optical waves.

In the above-mentioned configuration, the metal layer 10 mainly reflects the optical waves, instead of transmitting the optical waves. Accordingly, by employing the above-mentioned configuration, the problematic point, which the conventional photoacoustic imaging device has, in that a resolution is reduced by non-axisymmetric distortion which is caused when the optical waves are transmitted through the metal layer can be solved.

In addition, in the above-mentioned configuration, the metal layer 10 mainly transmits the photoacoustic waves, instead of reflecting the photoacoustic waves. Accordingly, by employing the above-mentioned configuration, a problematic point, which the conventional photoacoustic imaging device, in that a S/N ratio of the photoacoustic waves is reduced by mode conversion of the photoacoustic waves, which is caused when the photoacoustic waves are reflected by the metal layer, can be solved. In addition, since in order to avoid the reduction in the S/N ratio of the photoacoustic waves, adopting a configuration in which the photoacoustic waves are reflected twice is not required, a concern in that an increase in a size of the photoacoustic imaging device is caused and a concern in that an increase in a loss of the photoacoustic waves is caused are not raised.

Note that a frequency of the photoacoustic waves is lower by three digits, as compared with a frequency of the optical waves. Accordingly, a degree of refraction caused when the photoacoustic waves are transmitted through the metal layer 10 is so small as to be ignorable, as compared with a degree of refraction caused when the optical waves are transmitted through the metal layer 10. Therefore, the non-axisymmetric distortion caused when the photoacoustic waves are transmitted through the metal layer 10 does not exert substantial influence on the resolution of the photoacoustic imaging device.

1.2. Material of First Member and Second Member

In the photoacoustic element 1 according to the present embodiment, it is preferable that the first member 11 and the second member 12 are configured by glass or a ceramics material whose density is equal to or greater than $2.6 \times 10^3$ kg/m$^3$.

In a case where the density of the glass or the ceramics material by which the first member 11 and the second member 12 are configured is smaller than $2.6 \times 10^3$ kg/m$^3$, a difference between an acoustic impedance of each of the first member 11 and the second member 12 and an acoustic impedance of the metal layer 10 is increased. As a result, a reflectance with respect to the photoacoustic waves is increased (a transmittance is decreased). On the other hand, in a case where the density of the glass or the ceramics material by which the first member 11 and the second member 12 are configured is equal to or greater than $2.6 \times 10^3$ kg/m$^3$, the difference between the acoustic impedance of each of the first member 11 and the second member 12 and the acoustic impedance of the metal layer 10 is decreased. As a result, the reflectance with respect to the photoacoustic waves is decreased (the transmittance is increased). Accordingly, by employing the above-mentioned configuration, in the photoacoustic imaging device, photoacoustic waves having sufficient intensity can be detected.

In the photoacoustic element 1 according to the present embodiment, it is preferable that the first member 11 and the second member 12 are configured by glass or a ceramics material whose Poisson ratio is equal to or greater than 2.1.

In a case where the Poisson ratio of the glass or the ceramics material by which the first member 11 and the second member 12 are configured is smaller than 2.1, the difference between the acoustic impedance of each of the first member 11 and the second member 12 and the acoustic impedance of the metal layer 10 is increased. As a result, a reflectance with respect to the photoacoustic waves is increased (a transmittance is decreased). On the other hand, in a case where the Poisson ratio of the glass or the ceramics material by which the first member 11 and the second member 12 are configured is equal to or greater than 2.1, the difference between the acoustic impedance of each of the first member 11 and the second member 12 and the acoustic impedance of the metal layer 10 is decreased. As a result, the reflectance with respect to the photoacoustic waves is decreased (the transmittance is increased). Accordingly, by employing the above-mentioned configuration, in the photoacoustic imaging device, photoacoustic waves having sufficient intensity can be detected.

In the photoacoustic element 1 according to the present embodiment, it is preferable that that one or both of the first member 11 and the second member 12 are configured by optical glass or ceramics.

By employing the above-mentioned configuration, a Poisson ratio of Poisson ratios of one or both of the first member 11 and the second member 12 can be equal to or greater than 2.1 and a density or densities of one or both of the first member 11 and the second member 12 can be equal to or greater than $2.6 \times 10^3$ kg/m$^3$. Accordingly, by employing the above-mentioned configuration, in the photoacoustic imaging device, photoacoustic waves having sufficient intensity can be detected. Note that as the ceramics, for example, sapphire, alumina, and the like are cited. In addition, in a case where only one of the first member 11 and the second member 12 is configured by the optical glass or the ceramics, it is preferable that one of the first member 11 and the second member 12, on which the optical waves are made incident, is configured by the optical glass or the ceramics.

1.3. Configuration of Metal Layer

In the photoacoustic element 1 according to the present embodiment, it is preferable that the metal layer 10 includes, as a main layer, a metal layer whose thickness of a thinnest portion is equal to or greater than 20 nm.

In a case where the thickness of the thinnest portion of the main layer of the metal layer 10 is smaller than 20 nm, the metal layer 10 cannot sufficiently reflect the optical waves. On the other hand, in a case where the thickness of the main layer of the metal layer 10 is equal to or greater than 20 nm, the metal layer 10 can sufficiently reflect the optical waves. Accordingly, by employing the above-mentioned configuration, optical waves having sufficient intensity can be radiated to the object.

In a case where the thickness of the thinnest portion of the main layer of the metal layer 10 is smaller than 20 nm, it is difficult to sufficiently dissipate heat, generated when the metal layer 10 absorbs the optical waves, to an outside of the photoacoustic element. On the other hand, in a case where the thickness of the main layer of the metal layer 10 is equal to or Greater than 20 nm, it is made easy sufficiently dissipate heat, generated when the metal layer 10 absorbs the optical waves, to the outside of the photoacoustic element. Accordingly, by employing the above-mentioned configuration, heat resisting properties of the photoacoustic element 1 can be enhanced.

In the photoacoustic element 1 according to the present embodiment, it is preferable that the thickness of the thinnest portion of the main layer of the metal layer 10 is equal to or less than 1,000 nm.

In a case where the thickness of the thinnest portion of the main layer of the metal layer 10 is larger than 1,000 nm, the metal layer 10 cannot sufficiently transmit the photoacoustic waves. On the other hand, in a case where the thickness of the main layer of the metal layer 10 is equal to or less than 1,000 nm, it is made possible for the metal layer 10 to sufficiently transmit the photoacoustic waves. Accordingly, by employing the above-mentioned configuration, photoacoustic waves having sufficient intensity can be detected.

In addition, in a case where the thickness of the thinnest portion of the main layer of the metal layer 10 is larger than 1,000 nm, mode conversion of the photoacoustic waves, which is a factor to reduce the S/N ratio when the photoacoustic waves are transmitted through the metal layer 10, is easily caused. On the other hand, in a case where the thickness of the main layer of the metal layer 10 is equal to or less than 1,000 nm, the mode conversion of the photoacoustic waves, which is the factor to reduce the S/N ratio when the photoacoustic waves are transmitted through the metal layer 10, is hardly caused. Accordingly, by employing the above-mentioned configuration, the S/N ratio of the photoacoustic waves can be enhanced.

In addition, in a case where the thickness of the thinnest portion of the main layer of the metal layer 10 is larger than 1,000 nm, bonding between the metal layer 10 and each of the first member 11 and the second member 12 is easily broken by thermal expansion of the metal layer 10. On the other hand, in a case where the thickness of the main layer of the metal layer 10 is equal to or less than 1,000 nm, the bonding between the metal layer 10 and each of the first member 11 and the second member 12 is hardly broken by the thermal expansion of the metal layer 10. Accordingly, by employing the above-mentioned configuration, heat resisting properties of the photoacoustic element 1 can be enhanced.

Note that in the photoacoustic element 1 according to the present embodiment, the metal layer 10 may be configured only by the main layer or besides the main layer, the metal layer 10 may include a metal layer or metal layers which is or are formed on a primary surface or primary surfaces of one or both of the main layer and has a thickness of a thickest portion or have a thickness of each of thickest portions, which is equal to or less than 20 nm, as an underlayer or underlayers.

The underlayer or underlayers are included in the metal layer 10, thereby allowing a bonding strength between the metal layer 10 and one or both of the first member 11 and the second member 12 to be enhanced. In other words, robustness of the photoacoustic element 1 can be enhanced.

1.4. Reflection Conditions of Optical Waves

In the photoacoustic element 1 according to the present embodiment, it is preferable that when a complex refraction index of the main layer of the metal layer 10 is represented as No and a complex refraction index of the first member 11 or the second member 12 is represented as $N_1$, Expression (1) given below is satisfied.

[Expression 1]

$$\left(\frac{N_0 - N_1}{N_0 + N_1}\right)\left(\frac{N_0 - N_1}{N_0 + N_1}\right)^* > 0.7 \quad (1)$$

By employing the above-mentioned configuration, in a case where the complex refraction index of the first member 11 is represented as $N_1$, a reflectance with respect to the optical waves incident on the metal layer 10 from the first member 11 can be sufficiently made high. In addition, by employing the above-mentioned configuration, in a case where the complex refraction index of the second member 12 is represented as $N_1$, a reflectance with respect to the optical waves incident on the metal layer 10 from the second member 12 can be sufficiently increased. Accordingly, by employing the above-mentioned configuration, in the photoacoustic imaging device, it is made possible to radiate the optical waves having sufficient intensity to the object.

Note that in a case where a refraction index of the main layer of the metal layer 10 at an average working wavelength is represented as $n_0$ and an extinction coefficient is represented as k, a complex refraction index $N_0$ is given by $N_0=n_0-ik$. In addition, in a case where a refraction index of the first member 11 or the second member 12 at an average working wavelength is represented as $n_1$ and the extinction coefficient is represented as k, a complex refraction index $N_1$ is given by $N_1=n_1-1k$. Here, i represents an imaginary unit.

1.5. Transmission Conditions of Photoacoustic Waves

In the photoacoustic element 1 according to the present embodiment, it is preferable that when a specific gravity of the main layer of the metal layer 10 is represented as $\rho_0$, an acoustic velocity in the main layer of the metal layer 10 is represented as $C_0$, a specific gravity of the first member 11 is represented as $\rho_1$, an acoustic velocity in the first member 11 is represented as $C_1$, a specific gravity of the second member 12 is $\rho_2$, and an acoustic velocity in the second member is represented as $C_2$, Conditional Expressions (2) and (3) given below are satisfied.

[Expression 2]

$$\frac{2\rho_1 C_1}{\rho_0 C_0 + \rho_1 C_1} < 0.5 \quad (2)$$

[Expression 3]

$$\frac{2\rho_2 C_2}{\rho_0 C_0 + \rho_2 C_2} < 0.5 \quad (3)$$

By employing the above-mentioned configuration, a reflectance with respect to the photoacoustic waves can be sufficiently made small. Accordingly, by employing the above-mentioned configuration, is the photoacoustic imaging device, photoacoustic waves having sufficient intensity can be detected.

1.6. Material of Metal Layer

In the photoacoustic element 1 according to the present embodiment, it is preferable that the main layer of the metal layer 10 is configured by Al (aluminum), Ti (titanium), Ag (silver), Cu (copper), Au (gold), Pt (platinum), or an alloy containing at least any of the above-mentioned metals.

Acoustic impedances of Al, Ti, Ag, Cu, Au, and Pt are approximately 17, approximately 27, approximately 37, approximately 45, approximately, 62, and approximately 84, respectively. Accordingly, by employing the above-mentioned configuration, a difference between the acoustic impedance of each of the first member 11 and the second member 12 and the acoustic impedance of the metal layer 10 can be suppressed to be small. Therefore, the reflectance with respect to the photoacoustic waves is decreased (the transmittance is increased) and as a result, in the photoacoustic imaging device, photoacoustic waves having sufficient intensity can be detected.

1.7. Suitable Material of First Member and Second Member (in a Case where the Metal Layer is an Al Layer)

In the photoacoustic element 1 according to the present embodiment, the main layer of the metal layer 10 can be configured by Al. In this case, it is preferable that the first member 11 and the second member 12 are configured by glass or a ceramics material whose acoustic impedance is equal co or greater than 15 and equal to or less than 19.

The acoustic impedance of Al is approximately 17. Accordingly, by employing the above-mentioned configuration, a difference between the acoustic impedance of the main layer of the metal layer 10 and the acoustic impedance of each of the first member 11 and the second member 12 can be suppressed to be at most approximately 2. Accordingly, by employing the above-mentioned configuration, a reflectance with respect to the photoacoustic waves can be suppressed to be at most approximately 5%.

Note that as the glass or the ceramics material whose acoustic impedance is equal to or greater than 15 and equal to or less than 19, for example, glass or ceramics materials shown in the following Table 1 are cited.

TABLE 1

| Glass Name | Young's Modulus E | Poisson Ratio μ | Density ρ | Acoustic Impedance |
|---|---|---|---|---|
| <OHARA INC.> | | | | |
| S-TIM 2 | 0.230 | 2.69 | 776 | 15.56 |
| S-TIM 1 | 0.234 | 2.71 | 786 | 15.77 |
| S-BAL 2 | 0.245 | 2.89 | 727 | 15.81 |
| S-TIM27 | 0.236 | 2.76 | 793 | 16.01 |
| S-BAL 3 | 0.249 | 2.98 | 719 | 16.02 |
| S-TIM22 | 0.238 | 2.79 | 798 | 16.17 |
| S-BAM 4 | 0.244 | 2.91 | 762 | 16.22 |
| S-BAL14 | 0.240 | 2.89 | 811 | 16.62 |
| S-NBM51 | 0.243 | 2.93 | 817 | 16.84 |
| S-TIM25 | 0.236 | 2.91 | 841 | 16.93 |
| S-BAL41 | 0.242 | 2.78 | 890 | 17.11 |
| S-TIM28 | 0.242 | 2.98 | 855 | 17.36 |
| S-TIM35 | 0.238 | 2.96 | 875 | 17.44 |
| S-NPH 7 | 0.269 | 3.30 | 753 | 17.60 |
| S-PHM53 | 0.285 | 3.51 | 708 | 17.93 |
| S-BAL42 | 0.246 | 3.19 | 847 | 17.94 |
| S-TIH 1 | 0.247 | 3.06 | 884 | 17.97 |
| S-NBH 5 | 0.248 | 3.02 | 902 | 18.05 |
| S-TIH18 | 0.248 | 3.07 | 891 | 18.08 |
| S-BAL35 | 0.250 | 3.31 | 832 | 18.18 |
| S-TIH13 | 0.249 | 3.10 | 899 | 18.27 |
| S-BSM28 | 0.258 | 3.23 | 853 | 18.32 |
| S-FPL55 | 0.302 | 3.59 | 698 | 18.42 |
| S-FPL53 | 0.303 | 3.62 | 691 | 18.43 |
| S-BSM 2 | 0.264 | 3.53 | 780 | 18.43 |
| S-TIH14 | 0.254 | 3.17 | 888 | 18.45 |
| S-TIH 3 | 0.254 | 3.11 | 908 | 18.48 |
| S-NBH52V | 0.246 | 3.01 | 963 | 18.58 |
| S-PHM52 | 0.292 | 3.67 | 715 | 18.59 |
| S-BAM12 | 0.253 | 3.18 | 904 | 18.63 |
| L-BAL35 | 0.252 | 2.82 | 1008 | 18.50 |
| L-BAL35P | 0.252 | 2.82 | 1008 | 18.50 |
| L-BAL42 | 0.247 | 3.05 | 891 | 18.01 |
| L-BAL42P | 0.247 | 3.05 | 891 | 18.01 |
| L-BAL43 | 0.250 | 3.05 | 904 | 18.19 |
| L-TIM28 | 0.254 | 2.88 | 845 | 17.15 |
| L-TIM28P | 0.254 | 2.88 | 845 | 17.15 |
| <HIKARI GLASS Co., Ltd> | | | | |
| J-F3 | 0.221 | 2.64 | 806 | 15.60 |
| J-BAF3 | 0.244 | 2.74 | 760 | 15.72 |
| J-F1 | 0.231 | 2.69 | 815 | 15.96 |
| J-F2 | 0.231 | 2.66 | 825 | 15.96 |
| J-SF7 | 0.238 | 2.76 | 788 | 15.98 |
| J-SF2 | 0.247 | 2.72 | 805 | 16.16 |
| J-KZFH1 | 0.249 | 2.80 | 813 | 16.51 |
| J-BAK4 | 0.246 | 2.84 | 821 | 16.67 |
| J-BAK1 | 0.251 | 3.17 | 733 | 16.71 |
| J-BALF4 | 0.262 | 3.13 | 743 | 16.90 |
| J-BAF4 | 0.236 | 2.89 | 846 | 16.92 |
| J-SK11 | 0.241 | 3.06 | 799 | 16.99 |
| J-SF5 | 0.249 | 2.90 | 833 | 17.01 |
| J-SF15 | 0.254 | 2.95 | 842 | 17.33 |
| J-SF8 | 0.252 | 2.93 | 864 | 17.46 |
| J-BASF2 | 0.252 | 3.08 | 848 | 17.74 |
| J-SK12 | 0.252 | 3.23 | 816 | 17.82 |
| Q-SK52S | 0.296 | 2.80 | 853 | 17.83 |
| J-PSK03 | 0.284 | 3.52 | 700 | 17.83 |
| J-SF1 | 0.255 | 3.07 | 875 | 18.04 |
| J-SF10 | 0.251 | 3.06 | 886 | 18.05 |
| J-BAF8 | 0.261 | 3.14 | 857 | 18.16 |
| J-SSK8 | 0.260 | 3.18 | 856 | 18.25 |
| J-SFH1 | 0.259 | 3.31 | 830 | 18.32 |
| J-SFH1HS | 0.259 | 3.31 | 830 | 18.32 |
| J-SF13 | 0.254 | 3.10 | 895 | 18.32 |
| J-PSKH4 | 0.274 | 3.28 | 816 | 18.37 |
| Q-PSKH4S | 0.274 | 3.28 | 816 | 18.37 |
| Q-SK55S | 0.240 | 2.95 | 971 | 18.37 |
| J-SK5 | 0.252 | 3.26 | 861 | 18.39 |
| J-SK2 | 0.266 | 3.53 | 776 | 18.42 |
| J-PSK02 | 0.291 | 3.56 | 733 | 18.52 |
| J-FK01A | 0.297 | 3.65 | 716 | 18.68 |
| Q-FK01AS | 0.297 | 3.65 | 716 | 18.68 |
| <HOYA CORPORATION> | | | | |
| E-F5 | 0.232 | 2.63 | 790 | 15.54 |
| E-F3 | 0.233 | 2.64 | 800 | 15.69 |
| E-F1 | 0.242 | 2.70 | 780 | 15.78 |
| E-FD7 | 0.245 | 2.75 | 790 | 16.07 |
| LBC3N | 0.300 | 3.84 | 520 | 16.40 |
| BAC4 | 0.253 | 2.85 | 810 | 16.69 |
| E-FD5 | 0.251 | 2.90 | 820 | 16.91 |
| FF8 | 0.243 | 3.14 | 770 | 16.93 |
| BACD11 | 0.241 | 3.07 | 800 | 17.03 |
| E-FD15 | 0.250 | 2.95 | 850 | 17.35 |
| E-FD80 | 0.265 | 3.26 | 750 | 17.39 |
| M-FD80 | 0.265 | 3.26 | 750 | 17.39 |
| MP-FD80 | 0.265 | 3.26 | 750 | 17.39 |
| MC-FD80 | 0.265 | 3.26 | 750 | 17.39 |
| E-FD8 | 0.256 | 2.97 | 840 | 17.40 |
| M-BACD12 | 0.252 | 3.01 | 900 | 18.06 |
| MP-BACD12 | 0.252 | 3.01 | 900 | 18.06 |
| MC-BACD12 | 0.252 | 3.01 | 900 | 18.06 |
| E-FD1 | 0.258 | 3.08 | 870 | 18.07 |
| E-FD10 | 0.256 | 3.07 | 880 | 18.11 |
| M-BACD5N | 0.254 | 2.82 | 980 | 18.28 |
| MP-BACD5N | 0.254 | 2.82 | 980 | 18.28 |
| MC-BACD5N | 0.254 | 2.82 | 980 | 18.28 |
| FD225 | 0.264 | 3.32 | 820 | 18.33 |
| BACD2 | 0.268 | 3.53 | 770 | 18.39 |
| PCD4 | 0.293 | 3.52 | 730 | 18.42 |
| FCD10 | 0.297 | 3.60 | 710 | 18.47 |
| BACD5 | 0.254 | 3.27 | 870 | 18.55 |
| FCD100 | 0.302 | 3.53 | 720 | 18.55 |
| FD140 | 0.256 | 3.14 | 910 | 18.62 |

In the above Table 1, a Young's modulus E $[10^8 \text{N/m}^2]$, a Poisson ratio μ, a density ρ $[10^3 \text{ kg/m}^3]$, and an acoustic impedance $[10^6 \text{ kg/m}^2\text{s}]$ of each of the glass or the ceramics materials are shown. Note that the acoustic impedance of each of the glass or the ceramics materials can be calculated from the Young's modulus F, the Poisson ratio μ, and the density ρ of each of the glass or the ceramics materials and can also be directly measured.

Figure 2:
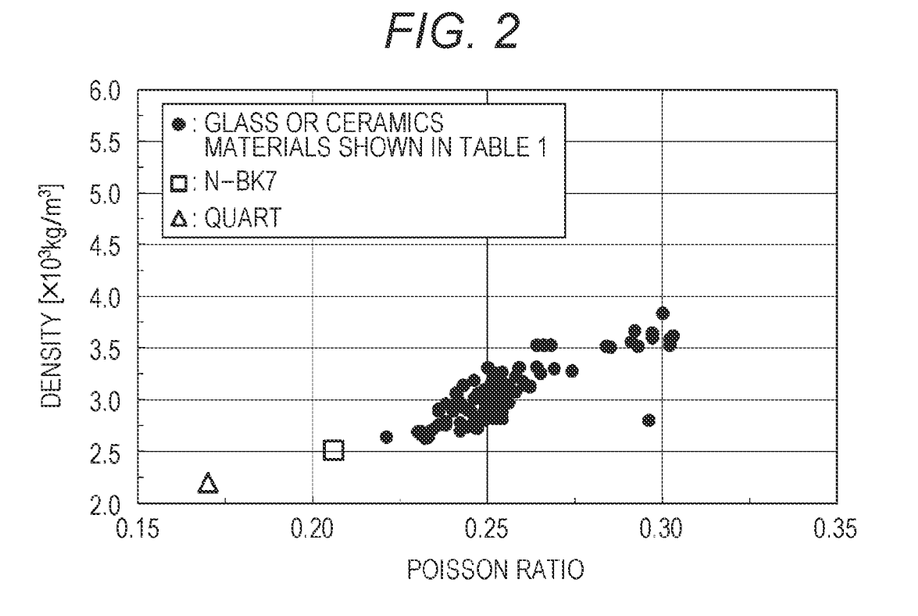
FIG. 2 is a graph in which a Poisson ratio μ and a density ρ of glass or a ceramics material which can be used as a material of a first member and a second member are plotted in a case where in the photoacoustic element illustrated in FIG. 1, a main layer of a metal layer an Al layer.

FIG. 2 is a graph in which the Poisson ratio μ and the density ρ of each of the glass or the ceramics materials shown in the above Table 1 are plotted. In FIG. 2, in addition to the glass or the ceramics materials shown in the above Table 1, a Poisson ratio μ and a density ρ of each of the N-BK7 and the quart are also plotted. With reference to FIG. 2, it can be confirmed that by configuring the first member 11 and the second member 12 by each of the glass or the ceramics materials shown in the above table 1, the acoustic impedance of each of the first member 11 and the second member 12 can be made larger than that in a case where the first member 11 and the second member 12 are configured by the N-BK7 or the quart, that is, a difference with the acoustic impedance of the main layer of the metal layer 10 can be made small.

1.7. Suitable Material of First Member and Second Member (in a Case where the Metal Layer is an Ag Layer)

In the photoacoustic element 1 according to the present embodiment, the main layer of the metal layer 10 can be configured by Ag. In this case, it is preferable that the first member 11 and the second member 12 are configured by glass or a ceramics material whose acoustic impedance is equal to or greater than 25 and equal to or less than 49.

The acoustic impedance of Ag is approximately 37. Accordingly, by employing the above-mentioned configuration, a difference between the acoustic impedance of the main layer of the metal layer 10 and the acoustic impedance of each of the first member 11 and the second member 12 can be suppressed to be at most approximately 12. Accordingly, by employing the above-mentioned configuration, a reflectance with respect to the photoacoustic waves can be suppressed to be at most approximately 20%.

Note that as the glass or the ceramics material whose acoustic impedance is equal to or greater than 25 and equal to or less than 49, for example, glass or ceramics materials shown in the following Table 2 are cited.

TABLE 2

| Glass Name | Young's Modulus E | Poisson Ratio μ | Density ρ | Acoustic Impedance |
|---|---|---|---|---|
| <OHARA INC.> | | | | |
| S-LAM54 | 0.292 | 4.08 | 1172 | 25.10 |
| S-LAL61 | 0.291 | 4.04 | 1190 | 25.13 |
| S-LAL19 | 0.295 | 3.98 | 1198 | 25.16 |
| S-LAH88 | 0.242 | 4.74 | 1135 | 25.23 |
| S-LAH63 | 0.295 | 4.34 | 1121 | 25.42 |
| S-TIH57 | 0.292 | 4.20 | 1170 | 25.44 |
| S-LAL18 | 0.289 | 4.18 | 1204 | 25.65 |
| S-LAH52 | 0.297 | 4.41 | 1119 | 25.67 |
| S-LAH51 | 0.297 | 4.40 | 1129 | 25.75 |
| S-LAH97 | 0.995 | 4.17 | 1209 | 25.87 |
| S-LAH53 | 0.299 | 4.43 | 1127 | 25.89 |
| S-LAH55V | 0.253 | 4.73 | 1178 | 25.93 |
| S-LAH66 | 0.291 | 4.23 | 1219 | 26.03 |
| S-LAH52Q | 0.313 | 4.47 | 1098 | 26.20 |
| S-LAH53V | 0.309 | 4.41 | 1135 | 26.30 |
| S-LAH64 | 0.294 | 4.30 | 1224 | 26.40 |
| S-LAH96 | 0.296 | 4.54 | 1187 | 26.79 |
| S-LAH65VS | 0.300 | 4.46 | 1223 | 27.10 |
| S-LAH60 | 0.296 | 4.43 | 1248 | 27.13 |
| S-LAH95 | 0.302 | 4.64 | 1177 | 27.19 |
| S-LAH55VS | 0.297 | 4.58 | 1223 | 27.35 |
| S-LAH89 | 0.303 | 4.70 | 1208 | 27.76 |
| S-LAH65V | 0.298 | 4.72 | 1220 | 27.76 |
| S-LAH93 | 0.304 | 4.83 | 1247 | 28.64 |
| S-LAH92 | 0.306 | 4.87 | 1230 | 28.64 |
| S-LAH59 | 0.298 | 5.07 | 1250 | 29.13 |
| S-LAH98 | 0.306 | 4.94 | 1293 | 29.58 |
| S-LAH79 | 0.297 | 5.23 | 1255 | 29.60 |
| S-LAH99 | 0.307 | 5.02 | 1313 | 30.09 |
| S-LAH58 | 0.301 | 5.52 | 1268 | 30.74 |
| <HIKARI GLASS Co., Ltd> | | | | |
| J-LASF013 | 0.297 | 4.20 | 1126 | 25.13 |
| J-LASFH2 | 0.293 | 4.11 | 1171 | 25.21 |
| J-LASF01 | 0.300 | 4.25 | 1115 | 25.26 |
| Q-LAFPH1S | 0.306 | 4.25 | 1097 | 25.27 |
| Q-LAF010S | 0.309 | 4.29 | 1081 | 25.32 |
| J-LAK18 | 0.292 | 4.17 | 1187 | 25.53 |
| J-LASF03 | 0.297 | 4.31 | 1140 | 25.61 |
| J-LASF010 | 0.297 | 4.28 | 1167 | 25.82 |
| Q-LASFH11S | 0.302 | 4.64 | 1072 | 25.95 |
| J-LASF016 | 0.295 | 4.26 | 1200 | 26.05 |
| Q-LASF03S | 0.310 | 4.48 | 1094 | 26.06 |
| J-LASKH2 | 0.297 | 4.29 | 1188 | 26.08 |
| J-LASF02 | 0.310 | 4.51 | 1091 | 26.12 |
| J-LASF017 | 0.297 | 4.34 | 1186 | 26.21 |
| J-LASF014 | 0.297 | 4.36 | 1196 | 26.38 |
| Q-LASFPH2S | 0.303 | 4.52 | 1135 | 26.39 |
| J-LASFH13 | 0.301 | 4.66 | 1115 | 26.48 |
| J-LASFH13HS | 0.301 | 4.66 | 1115 | 26.48 |
| J-LASF015 | 0.298 | 4.57 | 1196 | 27.05 |
| J-LASF015HS | 0.298 | 4.57 | 1196 | 27.05 |
| Q-LASFH12S | 0.299 | 4.68 | 1196 | 27.41 |
| J-LASFH15 | 0.301 | 4.79 | 1181 | 27.63 |
| J-LASFH15HS | 0.301 | 4.79 | 1181 | 27.63 |
| Q-LASFH59S | 0.308 | 4.81 | 1162 | 27.75 |
| Q-LASFPH3S | 0.303 | 4.83 | 1185 | 27.88 |
| J-LASFH17 | 0.298 | 4.69 | 1238 | 27.88 |
| J-LASFH17HS | 0.298 | 4.69 | 1238 | 27.88 |
| J-LASF05 | 0.303 | 4.79 | 1198 | 27.91 |

TABLE 2-continued

| Glass Name | Young's Modulus E | Poisson Ratio μ | Density ρ | Acoustic Impedance |
|---|---|---|---|---|
| J-LASF05HS | 0.303 | 4.79 | 1198 | 27.91 |
| J-LASFH9A | 0.303 | 4.91 | 1233 | 28.67 |
| Q-LASFH58S | 0.301 | 5.03 | 1222 | 28.81 |
| J-LASF09A | 0.299 | 4.99 | 1244 | 28.87 |
| J-LASFH22 | 0.306 | 5.08 | 1204 | 28.94 |
| J-LASFH21 | 0.306 | 5.05 | 1282 | 29.78 |
| J-LASFH16 | 0.307 | 5.10 | 1303 | 30.21 |
| J-LASF08A | 0.302 | 5.41 | 1249 | 30.25 |
| <HOYA CORPORATION> | | | | |
| M-NBF1 | 0.307 | 4.25 | 1110 | 25.46 |
| MP-NBF1 | 0.307 | 4.25 | 1110 | 25.46 |
| MC-NBF1 | 0.307 | 4.25 | 1110 | 25.46 |
| TAC2 | 0.299 | 4.19 | 1170 | 25.65 |
| NBFD3 | 0.292 | 4.39 | 1150 | 25.79 |
| NBFD12 | 0.305 | 4.45 | 1100 | 25.85 |
| NBFD13 | 0.301 | 4.38 | 1140 | 25.96 |
| NBFD11 | 0.310 | 4.43 | 1100 | 25.99 |
| M-TAC80 | 0.290 | 4.28 | 1210 | 26.05 |
| MP-TAC80-60 | 0.290 | 4.28 | 1210 | 26.05 |
| TAFD25 | 0.299 | 4.51 | 1130 | 26.16 |
| M-NBFD130 | 0.304 | 4.56 | 1110 | 26.25 |
| MP-NBFD130 | 0.304 | 4.56 | 1110 | 26.25 |
| MC-NBFD130 | 0.304 | 4.56 | 1110 | 26.25 |
| TAG 6 | 0.297 | 4.27 | 1210 | 26.26 |
| M-NBFD10 | 0.300 | 4.39 | 1180 | 26.41 |
| MP-NBFD10-20 | 0.300 | 4.39 | 1180 | 26.41 |
| NBFD10 | 0.293 | 4.57 | 1160 | 26.46 |
| TAF1 | 0.277 | 4.28 | 1290 | 26.47 |
| TAF2 | 0.300 | 4.35 | 1210 | 26.62 |
| MC-NBFD135 | 0.303 | 4.67 | 1130 | 26.77 |
| M-TAC60 | 0.290 | 4.41 | 1250 | 26.88 |
| MP-TAC60-90 | 0.290 | 4.41 | 1250 | 26.88 |
| TAF3D | 0.297 | 4.40 | 1230 | 26.88 |
| M-TAF401 | 0.299 | 4.62 | 1180 | 27.05 |
| MP-TAF401 | 0.299 | 4.62 | 1180 | 27.05 |
| MC-TAF401 | 0.299 | 4.62 | 1180 | 27.05 |
| M-TAF101 | 0.298 | 4.56 | 1210 | 27.18 |
| MP-TAF101-100 | 0.298 | 4.56 | 1210 | 27.18 |
| MC-TAF101-100 | 0.298 | 4.56 | 1210 | 27.18 |
| TAF4 | 0.299 | 4.54 | 1220 | 27.27 |
| M-TAF105 | 0.295 | 4.62 | 1230 | 27.47 |
| MP-TAF105 | 0.295 | 4.62 | 1230 | 27.47 |
| MC-TAF105 | 0.295 | 4.62 | 1230 | 27.47 |
| TAFD5G | 0.300 | 4.57 | 1230 | 27.51 |
| TAFD40-W | 0.298 | 4.73 | 1210 | 27.68 |
| TAFD40 | 0.298 | 4.73 | 1210 | 27.68 |
| TAFD5F | 0.300 | 4.72 | 1220 | 27.84 |
| TAF3 | 0.298 | 4.65 | 1250 | 27.89 |
| M-TAF1 | 0.297 | 4.83 | 1220 | 28.05 |
| MC-TAF1 | 0.297 | 4.83 | 1220 | 28.05 |
| M-TAF31 | 0.299 | 4.84 | 1230 | 28.27 |
| MP-TAF31-15 | 0.299 | 4.84 | 1230 | 28.27 |
| MC-TAF31-15 | 0.299 | 4.84 | 1230 | 28.27 |
| TAFD32 | 0.302 | 4.84 | 1230 | 28.39 |
| M-TAFD51 | 0.300 | 5.01 | 1210 | 28.57 |
| MP-TAFD51-50 | 0.300 | 5.01 | 1210 | 28.57 |
| MC-TAFD51-50 | 0.300 | 5.01 | 1210 | 28.57 |
| TAFD37A | 0.305 | 4.90 | 1240 | 28.80 |
| TAF5 | 0.300 | 5.06 | 1230 | 28.95 |
| M-TAFD305 | 0.308 | 5.25 | 1160 | 28.97 |
| MP-TAFD305 | 0.308 | 5.25 | 1160 | 28.97 |
| MC-TAFD305 | 0.308 | 5.25 | 1160 | 28.97 |
| M-TAFD405 | 0.310 | 5.45 | 1120 | 29.09 |
| MP-TAFD405 | 0.310 | 5.45 | 1120 | 29.09 |
| TAFD35 | 0.303 | 4.97 | 1260 | 29.16 |
| M-TAFD307 | 0.310 | 5.49 | 1140 | 29.45 |
| MP-TAFD307 | 0.310 | 5.49 | 1140 | 29.45 |
| MC-TAFD307 | 0.310 | 5.49 | 1140 | 29.45 |
| TAFD45 | 0.306 | 5.10 | 1280 | 29.90 |
| TAFD37 | 0.303 | 5.19 | 1270 | 29.91 |
| TAFD33 | 0.302 | 5.40 | 1240 | 30.11 |
| TAFD55-W | 0.305 | 5.12 | 1300 | 30.15 |
| TAFD55 | 0.305 | 5.12 | 1300 | 30.15 |
| TAFD30 | 0.301 | 5.42 | 1260 | 30.36 |
| TAFD65 | 0.303 | 5.27 | 1360 | 31.19 |

TABLE 2-continued

| Glass Name | Young's Modulus E | Poisson Ratio μ | Density ρ | Acoustic Impedance |
|---|---|---|---|---|
| <Ceramics> | | | | |
| Alumina | 0.240 | 3.90 | 4000 | 42.88 |
| Sapphire | 0.230 | 3.97 | 4700 | 46.51 |

In the above Table 2, a Young's modulus E [$10^8 N/m^2$], a Poisson ratio μ, a density ρ [$10^3$ kg/m$^3$], and an acoustic impedance [$10^6$ kg/m$^2$s] of each of the glass or the ceramics materials are shown. Note that the acoustic impedance of each of the glass or the ceramics materials can be calculated from the Young's modulus F, the Poisson ratio μ, and the density ρ of each of the glass or the ceramics materials and can also be directly measured.

Figure 3:
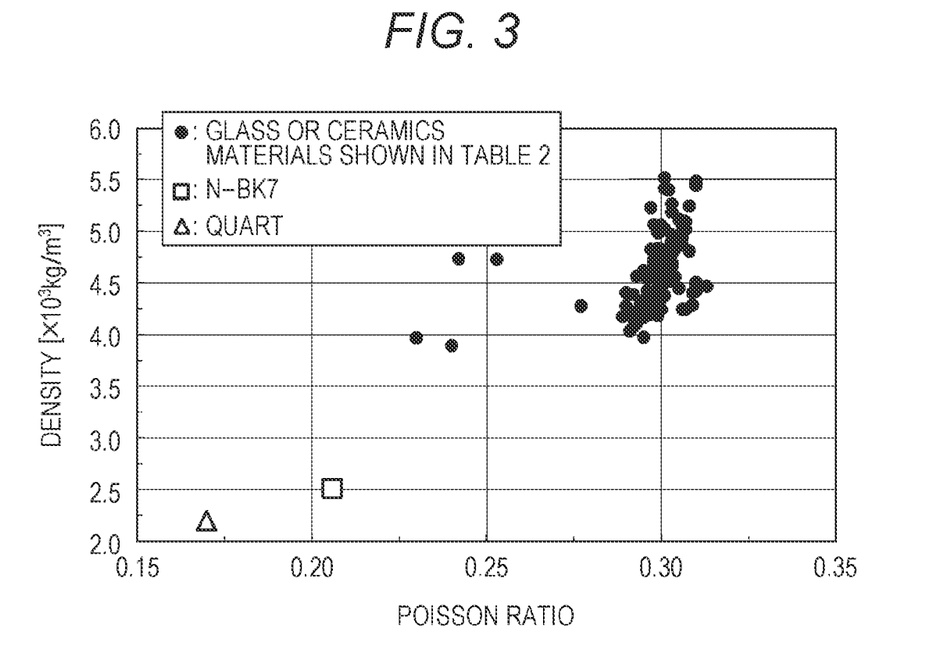
FIG. 3 is a graph in which a Poisson ratio μ and a density ρ of glass or a ceramics material which can be used as the material of the first member and the second member are plotted in a case where in the photoacoustic element illustrated in FIG. 1, the main layer of the metal layer is an Ag layer.

FIG. 3 is a graph in which the Poisson ratio μ and the density ρ of each of the glass or the ceramics material shown in the above Table 2 are plotted. In FIG. 3, in addition to the glass or the ceramics materials shown in the above Table 2, a Poisson ratio μ and a density ρ of each of the N-BK7 and the quart are also plotted. With reference to FIG. 3, it can be confirmed that by configuring the first member 11 and the second member 12 by each of the glass or the ceramics materials shown in the above table 2, the acoustic impedance of each of the first member 11 and the second member 12 can be made larger than that in a case where the first member 11 and the second member 12 are configured by the N-BK7 or the quart, that is, a difference with the acoustic impedance of the main layer of the metal layer 10 can be made small.

1.7. Shape of Metal Layer

In the photoacoustic element 1 according to the present embodiment, it is preferable that one primary surface of the metal layer 10 is made to be a concave surface an a parabolic surface shape.

By employing the above-mentioned configuration, the one primary surface of the metal layer 10 is used as a concave mirror, thereby allowing the optical waves reflected by the metal layer 10 to be collected. Accordingly, by employing the above-mentioned configuration, a beam waist diameter of the optical waves radiated to the object can be made small and as a result, a resolution of the photoacoustic imaging device can be enhanced. In addition, by employing the above-mentioned configuration, a distance from the photoacoustic element 1 to the object can be made small and as a result, the photoacoustic imaging device can be downsized.

1.8. Devising to Enhance Robustness and Heat Resisting Properties of Metal Layer In the photoacoustic element 1 according to the present embodiment, it is preferable that the metal layer 10 is configured by a first metal layer formed on a surface of the first member 11 and a second metal layer formed on a surface of the second member 12 and a surface of the first metal layer on a side opposite to a side of the first member 11 and a surface of the second metal layer on a side opposite to a side of the second member 12 are thermally bonded, electric diffusion-bonded, atomic diffusion-bonded, surface activated bonded, or brazed.

In a case where the first metal layer formed on the surface of the first member 11 and the second metal layer formed on the surface of the second member 12 are bonded to each other by an adhesive, heat resistance between the first metal layer and the second metal layer is increased. As a result, flowing of heat from the first metal layer to the second member 12 and flowing of the heat from the second metal layer to the first member 11 are hampered. Therefore, it is difficult to sufficiently dissipate heat, generated when the metal layer 10 absorbs the optical waves, to an outside of the photoacoustic element 1. On the other hand, in a case where the first metal layer formed on the surface of the first member 11 and the second metal layer formed on the surface of the second member 12 are bonded to each other as mentioned above, the heat resistance between the first metal layer and the second metal layer is decreased. As a result, flowing of the heat from the first metal layer to the second member 12 and flowing of the heat from the second metal layer to the first member 11 are promoted. Therefore, it is made easy to sufficiently dissipate heat, generated when the metal layer 10 absorbs the optical waves, to an outside of the photoacoustic element. In other words, by employing the above-mentioned configuration, heat resisting properties of the photoacoustic element 1 can be enhanced.

In addition, in the case where the first metal layer formed on the surface of the first member 11 and the second metal layer formed on the surface of the second member 12 are bonded to each other by the adhesive, an air layer between the first metal layer and the second metal layer, which is a factor of a transmission loss of the photoacoustic waves, is easily formed. On the other hand, in the case where the first metal layer formed on the surface of the first member 11 and the second metal layer formed on the surface of the second member 12 are bonded to each other as mentioned above, the air layer between the first metal layer and the second metal layer, which is the factor of the transmission loss of the photoacoustic waves, is hardly formed. Accordingly, by employing the above-mentioned configuration, in the photoacoustic imaging device, photoacoustic waves having sufficient intensity can be detected.

In addition, in the case where the first metal layer formed on the surface of the first member 11 and the second metal layer formed on the surface of the second member 12 are bonded to each other by the adhesive, positional deviation between the first member 11 and the second member 12 due to vibration, expansion, or contraction is easily caused. On the other hand, in the case where the first metal layer formed on the surface of the first member 11 and the second metal layer formed on the surface of the second member 12 are bonded to each other as mentioned above, the positional deviation between the first member 11 and the second member 12 due to the vibration, the expansion, or the contraction is hardly caused. In other words, by employing the above-mentioned configuration, robustness of the photoacoustic element 1 can be enhanced.

2. Photoacoustic Element Manufacturing Method

Figure 4:
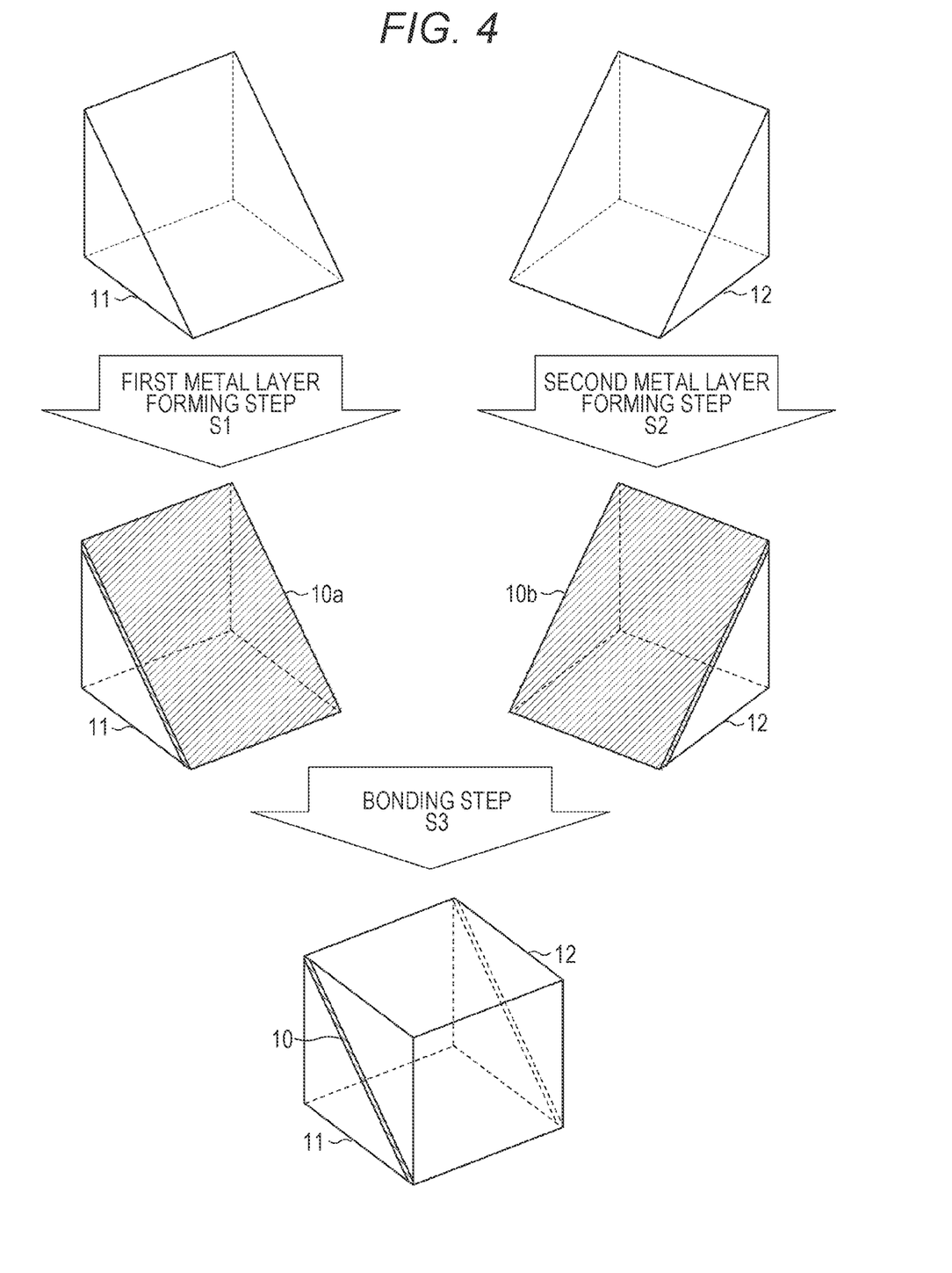
FIG. 4 is a flow diagram showing a flow of a method for manufacturing the photoacoustic element illustrated in FIG. 1.

With reference to FIG. 4, a flow of a method for manufacturing a photoacoustic element 1 will be described. FIG. 4 is a flow diagram showing the flow of the method for manufacturing a photoacoustic element 1.

The method for manufacturing the photoacoustic element 1 includes: a first metal layer forming step S11; a second metal layer forming step S12; and a bonding step S13.

The first metal layer forming step S11 is a step of forming a first metal layer 10A on the surface of the first member 11. For the formation of the first metal layer 10A, for example, an evaporation method, a sputtering method, a chemical vapor deposition (CVD) method, an atomic layer deposition (ALD) method, a plating method, or the like may be used. In a case where the first metal layer 10A includes an underlayer, first, the underlayer may be formed on the surface of the first member 11 by employing the above-mentioned method and thereafter, a main layer may be formed by employing the above-mentioned method.

The second metal layer forming step S12 is a step of forming a second metal layer 10B on the surface of the second member 12. For the formation of the second metal layer 10B, for example, an evaporation method, a sputtering method, a CVD method, an ALD method, a plating method, or the like may be used. In a case where the second metal layer 10B includes an underlayer, first, the underlayer may be formed on the surface of the second member 12 by employing the above-mentioned method and thereafter, a main layer may be formed by employing the above-mentioned method.

The bonding step S13 is a step of bonding a surface of the first metal layer 10A on a side opposite to a side of the first member 11 and a surface of the second metal layer 10B on a side opposite to a side of the second member 12. For bonding of the first metal layer 10A and the second metal layer 10B, thermal bonding, electric diffusion bonding, an atomic diffusion bonding method, a surface activated bonding method, or a brazing method may be used.

The bonding step S13 is conducted, thereby integrating the first metal layer 10A and the second metal layer 10B and obtaining the metal layer 10. In addition, the first member 11, the second member 12, and the metal layer 10 are integrated, thereby obtaining the photoacoustic element 1.

3. Photoacoustic Imaging Device

Figure 5:
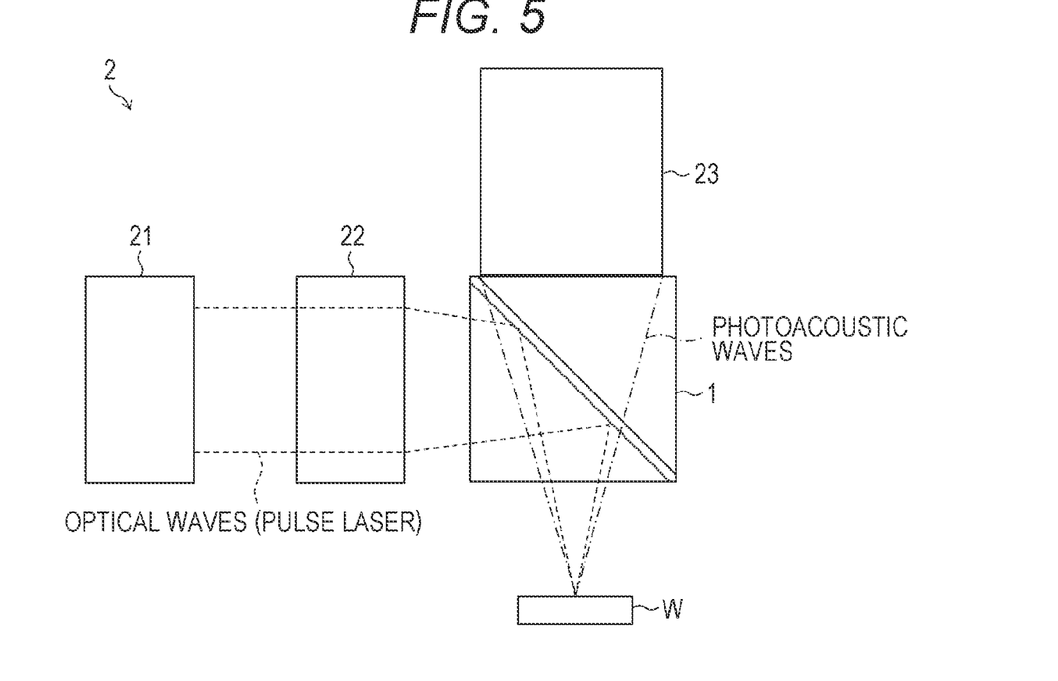
FIG. 5 is a block diagram showing a configuration of a photoacoustic imaging device which includes the photoacoustic element illustrated in FIG. 1.

With reference to FIG. 5, a configuration of a photoacoustic imaging device 2 which includes the photoacoustic element 1 will be described. FIG. 5 is a block diagram showing the configuration of the photoacoustic imaging device 2.

Besides the photoacoustic element 1, the photoacoustic imaging device 2 includes a light source 21, an objective optical system 22, and an acoustic wave detector 23.

The light source 21 is a component for generating optical waves. As the light source 21, for example, a pulse laser can be used. The objective optical system 22 is a component for collecting the optical waves emitted from the light source 21. As the objective optical system 22, for example, an objective lens can be used. The optical waves collected by the objective optical system 22 are reflected by the metal layer 10 of the photoacoustic element 1 and are radiated to an object W. The object W which has absorbed these optical waves generates the photoacoustic waves. These photoacoustic waves are transmitted through the metal layer of the photoacoustic element 1 and enter the acoustic wave detector 23. The acoustic wave detector 23 is a component for converting the photoacoustic waves to an electric signal. As the acoustic wave detector 23, for example, an acoustic transducer can be used.

The photoacoustic imaging device 2 may further include a function generator, not shown, which controls the light source 21. In addition, the photoacoustic imaging device 2 may further include a fast Fourier transform (FFT) analyzer, not shown, which processes the electric signal or by the acoustic wave detector 23. In addition, the photoacoustic imaging device 2 may further include a stage for scanning a focal point of the optical waves on the object W. On this stage, a water tank for housing the object W can be placed, and the object can be moved together with this water tank. In this case, the photoacoustic waves are radiated to the object W in water and the photoacoustic waves are emitted from the object in water. In addition, the photoacoustic imaging device 2 may further include an acoustic matching material, not shown, which is interposed between the object W and the photoacoustic element 1. In addition, the photoacoustic imaging device 2 may further include a plurality of objective optical systems 22 and a switching mechanism, not shown, which performs switching an objective optical system to be used among the objective optical systems. In this case, with an acoustic focal point shape used in combination, both images can also be superimposed. In addition, the above-described function generator, FFT analyzer, stage, and switching mechanism may be connected to a computer, not shown. In this case, in order to control the above-described function generator, stage, and switching mechanism, this computer is used to generate an image of the inside of the object from output of the FFT analyzer.

Note that a wavelength of the pulse laser generated by the light source 21 may be set in accordance with spectral absorption properties of the object W. In addition, a pulse width of the pulse laser generated by the light source 21 may be appropriately set in a range from several picoseconds up to several hundred nanoseconds. As one example, a pulse laser having a wavelength of 1064 nm and a pulse width of 10 ns can be used. In addition, by using a pulse laser whose wavelength of a pulse laser to be emitted is variable as the light source 21, the variability can be reflected in an image from which differences in absorption properties of parts of the object can be obtained. In addition, the acoustic wave detector 23 may be appropriately selected in accordance with the object W and the acoustic wave properties.

4. Embodiments of Photoacoustic Element 4.1. First Embodiment

Figure 6:
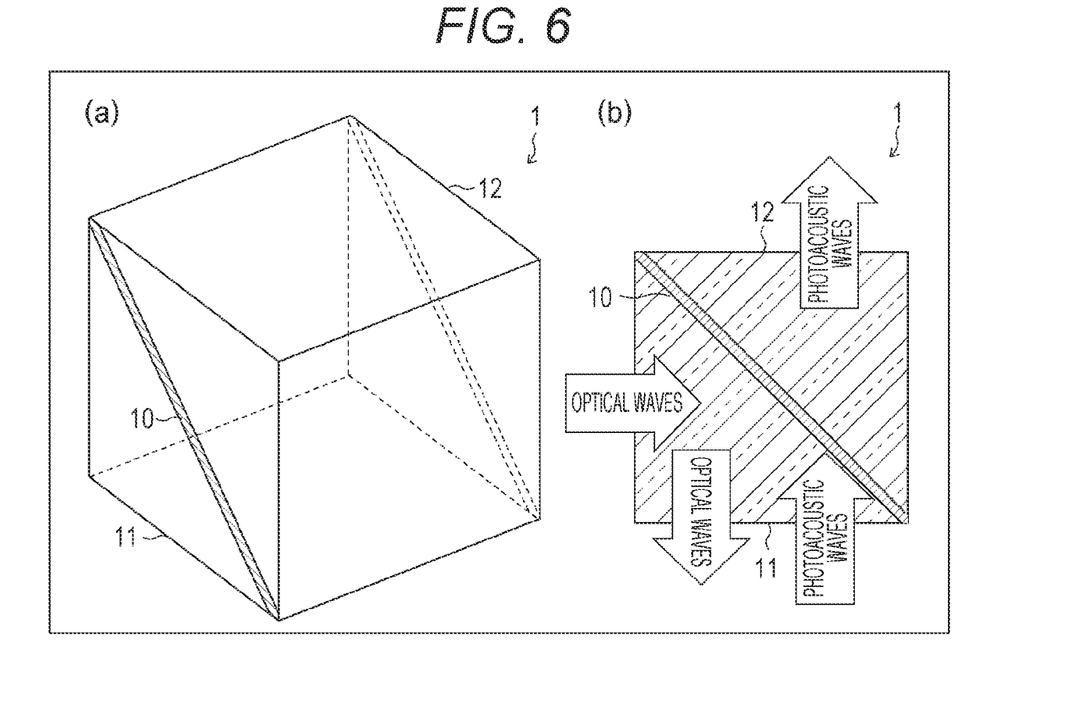
FIG. 6(a) is a perspective view of the photoacoustic element and FIG. 6(b) is a cross-sectional view of the photoacoustic element.

With reference to FIGS. 6(a) and 6(b), a first embodiment of the present invention will be described. FIG. 6(a) is a perspective view of a photoacoustic element 1 according to the present embodiment and FIG. 6(b) is a cross-sectional view of the photoacoustic element 1 according to the present embodiment.

As each of a first member 11 and a second member 12, a member in a triangular prism shape which had a base of an isosceles right triangle having each equal side of 10 mm and had a height of 10 mm was used. In the first member 11, one of side surfaces, which has 10 mm×10 mm, functions as an incident surface of optical waves, and another of the side surfaces, which has 10 mm×10 mm, functions as an emitting surface of the optical waves and as an incident surface of photoacoustic waves. In addition, in the first member 11, a side surface which has 10 mm×14.1 mm functions as a bonded surface which is bonded to the second member 12 via a metal layer 10. On the other hand, in the second member 12, one of side surfaces, which has 10 mm×10 mm, functions as an emitting surface of the photoacoustic waves. In addition, in the second member 12, a side surface which has 10 mm×14.1 mm functions as a bonded surface which is bonded to the first member 11 via the metal layer 10.

As a material of the first member 11 and the second member 12, S-LAH99 was used. The S-LAH99 is glass or a ceramics material whose refraction index is 1.99406, specific gravity is $5.02 \times 10^3$ kg/m$^3$, and acoustic velocity of longitudinal waves is $5.99 \times 10^3$ m/s. As the metal layer 10, used was a metal layer having a three-layered structure in which an Ag layer having a thickness of 100 nm was a main layer and Ti layers each having a thickness of one nm and formed on both primary surfaces of the main layer were underlayers.

In a case where as the material of the first member 11 and the second member 12, the S-LAH99 is used and as the material of the metal layer 10, Ag is used, in a broad wavelength band including visible light to near-infrared light, a reflectance with respect to the optical waves is equal to or greater than 90%. Therefore, a wavelength of the optical waves radiated to the object can be freely selected in this wavelength band. In addition, in this case, a reflectance with respect to the photoacoustic waves is approximately 11.3%. In addition, in this case, the inventors confirmed by numerical calculation using an ultrasonic simulator ComWAVE that no mode conversion of the photoacoustic waves was caused upon transmission through the metal layer 10. In addition, in a case where as the material of the metal layer 10, Ag was used, it was confirmed by this numerical calculation that when a thickness of the metal layer 10 was 100 nm, refraction of the photoacoustic waves in the metal layer 10 was ignorable.

4.2. Second Embodiment

Figure 7:
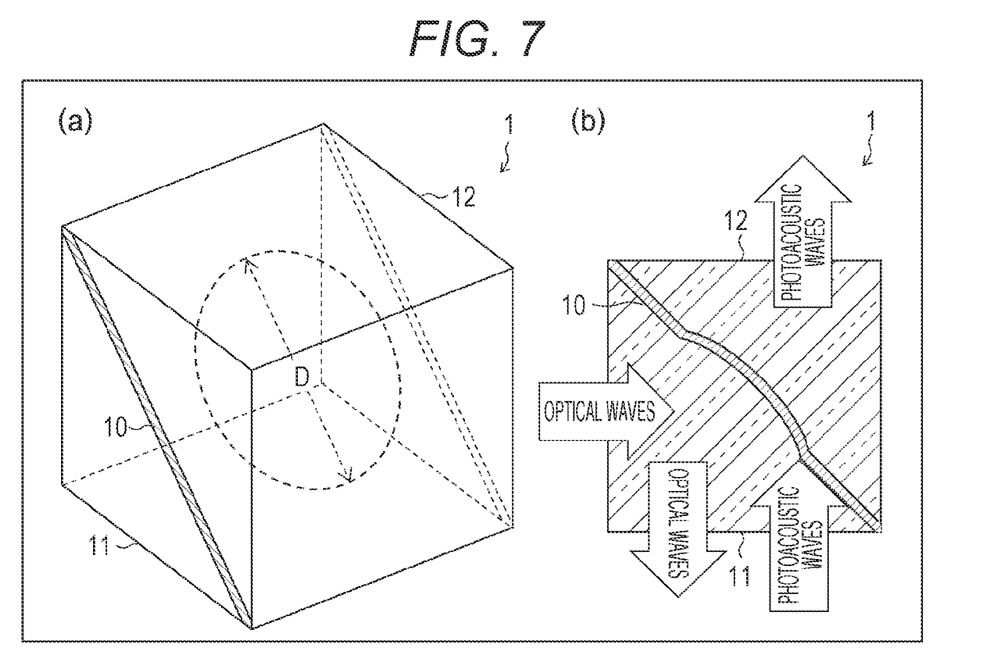
FIG. 7(a) is a perspective view of the photoacoustic element and FIG. 7(b) is a cross-sectional view of the photoacoustic element.

With reference to FIGS. 7(a) and 7(b), a second embodiment of the present invention will be described. FIG. 7(a) is a perspective view of a photoacoustic element 1 according to the present embodiment and FIG. 7(b) is a cross-sectional view of the photoacoustic element 1 according to the present embodiment.

As each of a first member 11 and a second member 12, a member in a triangular prism shape which had a base of an isosceles right triangle having each equal side of 15 mm and had a height of 15 mm was used. In the first member 11, one of side surfaces, which has 15 mm×15 mm, functions as an incident surface of optical waves, and another of the side surfaces, which has 15 mm×15 mm, functions as an emitting surface of the optical waves and as an incident surface of photoacoustic waves. In addition, in the first member 11, a side surface which has 15 mm×21.2 mm functions as a bonded surface which is bonded to the second member 12 via a metal layer 10. On the other hand, in the second member 12, one of side surfaces, which has 15 mm×15 mm, function as an emitting surface of the photoacoustic waves. In addition, in the second member 12, a side surface which has 15 mm×21.2 mm functions as a bonded surface which is bonded to the first member 11 via the metal layer 10.

The bonded surface of the first member 11 was subjected to convex surface processing so as to make the surface a non-axial parabolic surface. In addition, the bonded surface of the second member 12 was subjected to concave surface processing so as to make the surface a non-axial parabolic surface. In the bonded surfaces of the first member 11/second member 12, a diameter D of a circular region subjected to the convex surface processing/concave surface processing is 8 mm. Note that a Sag amount of the non-axial parabolic surface was 0.3 mm. Thus, the incident surface of the optical waves in the metal layer 10 is made to be a concave surface in the non-axial parabolic surface shape.

As a material of the first member 11 and the second member 12, S-BAL41 was used. The S-BAL41 is Glass or a ceramics material whose refraction index is 1.56188, specific gravity is $2.78 \times 10^3$ kg/m$^3$, and acoustic velocity of longitudinal waves is $6.15 \times 10^3$ m/s. As the metal layer 10, a metal layer which was constituted of an Al layer having a thickness of 80 nm and had a one-layered structure was used.

In a case where as the material of the first member 11 and the second member 12, the S-BAL41 is used and as the material of the metal layer 10, Al is used, in a wavelength band of visible light, a reflectance with respect to the optical waves is equal to or greater than 85%. Therefore, a wavelength of the optical waves radiated to the object can be freely selected in this wavelength band. In addition, in this case, a reflectance with respect to the photoacoustic waves is approximately 0.15%. In addition, in this case, the inventors confirmed by numerical calculation using an ultrasonic simulator ComWAVE that no mode conversion of the photoacoustic waves was caused upon transmission through the metal layer 10. In addition, in a case where as the material of the metal layer 10, Al was used, it was confirmed by this numerical calculation that when a thickness of the metal layer 10 was 80 nm, refraction of the photoacoustic waves in the metal layer 10 was ignorable.

In addition, in the photoacoustic element 1 according to the present embodiment, the incident surface of the optical waves in the metal layer 10 is made to be the concave surface in the non-axial parabolic surface shape. Accordingly, the metal layer 10 functions as a concave mirror which reflects the optical waves and collects the light. Therefore, the photoacoustic element 1 according to the embodiment assists an objective optical system 22 in light collecting power in a photoacoustic imaging device 2. Accordingly, without changing a focal point position of the optical waves, light whose NA is high can be made incident on the object.

4.3. Third Embodiment

Figure 8:
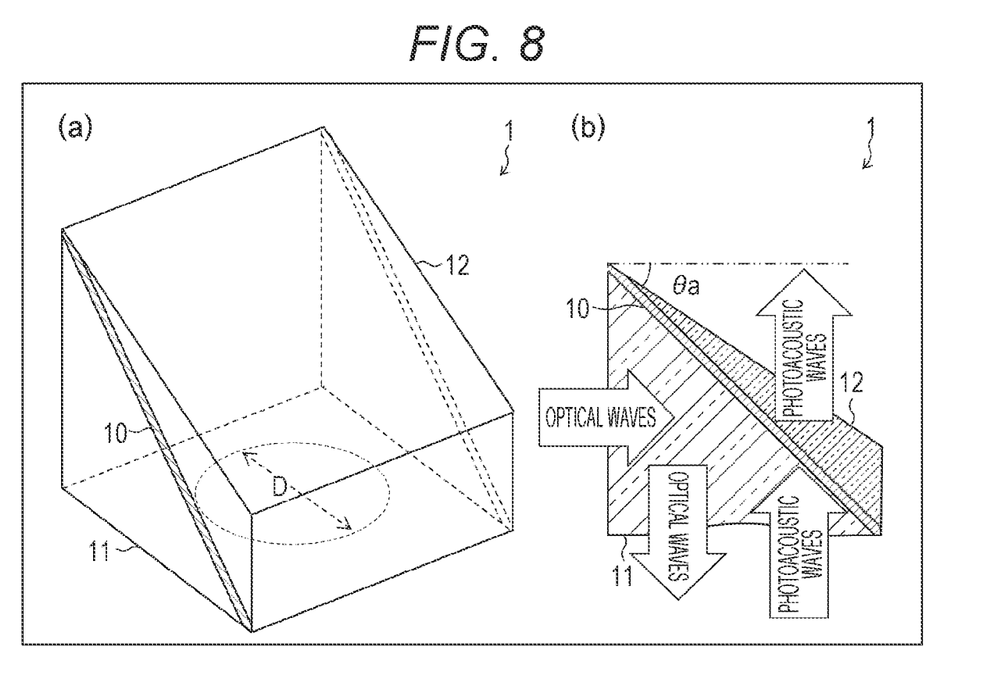
FIG. 8(a) is a perspective view of the photoacoustic element and FIG. 8(b) is a cross-sectional view of the photoacoustic element.

With reference to FIGS. 8(a) and 8(b), a third embodiment of the present invention will be described. FIG. 8(a) is a perspective view of a photoacoustic element 1 according to the present embodiment and FIG. 8(b) is a cross-sectional view of the photoacoustic element 1 according to the present embodiment. The photoacoustic element 1 according to the present embodiment is used in such a way that optical waves are made incident from a side of a first member 11 on a metal layer 10.

As the first member 11, a member in a triangular prism shape which had a base of an isosceles right triangle having each equal side of 10 mm and had a height of 10 mm was used. In the first member 11, a side surface which has 10 mm×14.1 mm functions as a bonded surface which is bonded to a second member 12 via the metal layer 10. In addition, in the first member 11, one of side surfaces, which has 10 mm×10 mm, functions as an incident surface of optical waves, and another of the side surfaces, which has 10 mm×10 mm, functions as an emitting surface of the optical waves and as an incident surface of photoacoustic waves. On the other hand, as the second member 12, a member in a triangular prism shape which had a base of a triangle having internal angles of 45°, 45°−θa, and 90°+θa and had a height of 10 rum was used. In The second member 12, a side surface which has 10 mm×14.1 mm functions as a bonded surface which is bonded to the first member 11 via the metal layer 10. In addition, in the second member 12, a side surface functions as an emitting surface of the photoacoustic waves, an angle formed between the bonded surface and the above-mentioned side surface being 45°−θa. An angle θa was set to 36° so as to make a vibration direction of the photoacoustic waves, which are longitudinal waves, orthogonal to the emitting surface of the photoacoustic waves in the second member 12.

The incident surface of the photoacoustic waves in the first member 11 was subjected to concave surface processing so as to make the surface a parabolic surface. In the incident surface of the photoacoustic waves in the first member 11, a diameter D of a circular region subjected to the concave surface processing is eight mm. Note that a Sag amount of the parabolic surface was one mm.

As a material of the first member 11, L-BAL42 was used. The L-BAL42 is glass or a ceramics material whose refraction index is 1.58106, specific gravity $3.05 \times 10^3$ kg/m$^3$, and acoustic velocity of the longitudinal waves is $5.90 \times 10^3$ m/s. On the other hand, as a material of the second member 12, silicon was used. The silicon is glass or a ceramics material whose specific gravity is $2.33 \times 10^3$ kg/m$^3$ and acoustic velocity of the longitudinal waves is $8.45 \times 10^3$ m/s. As the metal layer 10, a metal layer which was constituted of only an Al layer having a thickness of 110 nm and had a single layer structure was used.

In a case where as the material of the first member 11, the L-BAL42 is used and as the material of the metal layer 10, Al is used, a reflectance with respect to the optical waves is equal to or greater than 85% in a wavelength band of visible light. Therefore, a wavelength of the optical waves radiated to the object can be freely selected in this wavelength band. In addition, in this case, a reflectance with respect to the photoacoustic waves incident from the first member 11 on the metal layer 10 is approximately 2.7% and a reflectance with respect to the photoacoustic waves incident from the second member 12 on the metal layer 10 is approximately 7.1%. In addition, in this case, the inventors confirmed by numerical calculation using an ultrasonic simulator ComWAVE that no mode conversion of the photoacoustic waves was caused upon transmission through the metal layer 10. In addition, it was confirmed by this numerical calculation that when the photoacoustic waves were made incident from the first member 11 via the metal layer 10 on the second member 12 and were made incident from the second member 12 into air, the photoacoustic waves were refracted.

In addition, in the photoacoustic element 1 according to the present embodiment, the incident surface of the photoacoustic waves in the first member 11 is made to be a concave surface in a parabolic surface shape. Therefore, the first member 11 functions as an acoustic lens which transmits and collimates the photoacoustic waves. A focal point of this acoustic lens can be set to be the same point as a focal point of the optical waves radiated to the object and can also be set to be a point different therefrom. In a case where the focal point of the acoustic lens (focal point of the photoacoustic waves) is set to be the same point as the focal point of the optical waves, an S/N ratio of the photoacoustic waves can be further enhanced. Conversely, in a case where the focal point of this acoustic lens is set to be the point different from the focal point of the optical waves, a scan pitch can be made large.

In addition, in the photoacoustic element 1 according to the embodiment, the emitting surface of the photoacoustic waves in the second member 12 is orthogonal to the vibration direction of the photoacoustic waves which are the longitudinal waves. Therefore, the photoacoustic element 1 can be further downsized.

4.4. Fourth Embodiment

Figure 9:
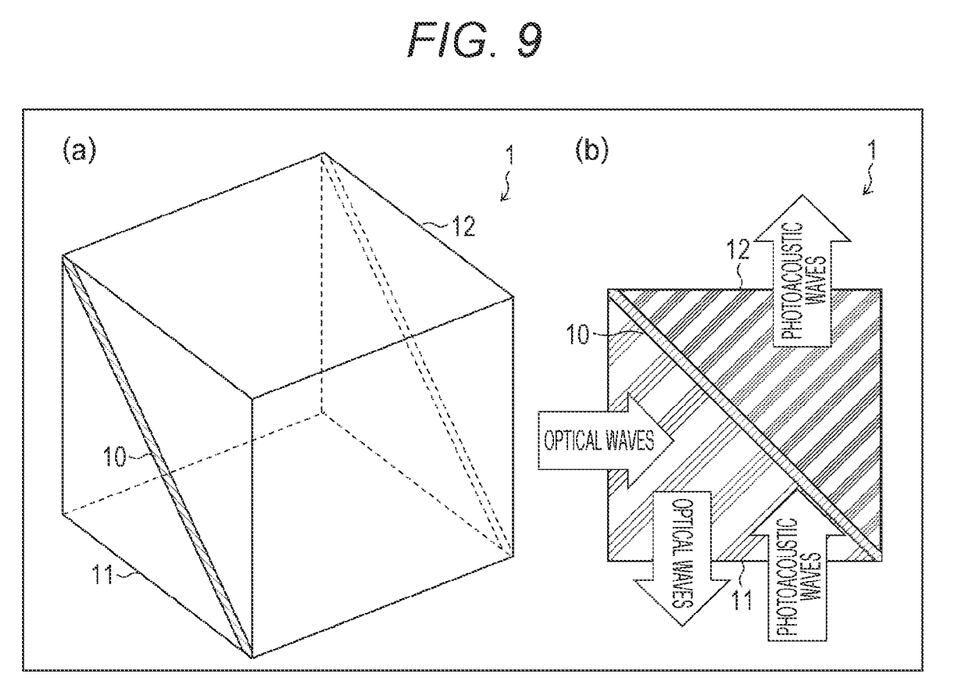
FIG. 9(a) is a perspective view of the photoacoustic element and FIG. 9(b) is a cross-sectional view of the photoacoustic element.

With reference to FIGS. 9(a) and 9(b), a fourth embodiment of the present invention will be described. FIG. 9(a) is a perspective view of a photoacoustic element 1 according to the present embodiment and FIG. 9(b) is a cross-sectional view of the photoacoustic element 1 according to the present embodiment.

As each of a first member 11 and a second member 12, a member in a triangular prism shape which had a base of an isosceles right triangle having each equal side of 15 mm and had a height of 15 mm was used. In the first member 11, one of side surfaces, which has 15 mm×15 mm, functions as an incident surface of optical waves, and another of the side surfaces, which has 15 mm×15 mm, functions as an emitting surface of the optical waves and as an incident surface of photoacoustic waves. In addition, in the first member 11, a side surface which has 15 mm×21.2 mm functions as a bonded surface which is bonded to the second member 12 via a metal layer 10. On the other hand, in the second member 12, one of side surfaces, which has 15 mm×15 mm, function as an emitting surface of the acoustic waves. In addition, in the second member 12, a side surface which has 15 mm×21.2 mm functions as a bonded surface which is bonded to the first member 11 via the metal layer 10.

As a material of the first member 11, monocrystal sapphire ceramics was used. The monocrystal sapphire ceramics is a material whose refraction index is 1.760, specific gravity is $3.97 \times 10^3$ kg/m$^3$, and acoustic velocity of longitudinal waves is $11.72 \times 10^3$ m/s. On the other hand, as a material of the second member 12, alumina ceramics was used. The alumina ceramics is a material whose specific gravity is $3.9 \times 10^3$ kg/m$^3$ and acoustic velocity of the longitudinal waves is $10.99 \times 10^3$ m/s. As the metal layer 10, used was a metal layer having a three-layered structure in which an Ag layer having a thickness of 110 nm was a main layer and ZnO layers each having a thickness of 1 nm and formed on both primary surfaces of the main layer were underlayers.

In a case where as the material of the first member 11, the monocrystal sapphire ceramics is used and as the material of the metal layer 10, Ag is used, in a broad wavelength band including visible light to near-infrared light, a reflectance with respect to the optical waves is equal to or greater than 90%. Therefore, a wavelength of the optical waves radiated to the object can be freely selected in this wavelength band. In addition, in this case, a reflectance with respect to the photoacoustic waves incident from the first member 11 on the metal layer 10 is approximately 10.3% and a reflectance with respect to the photoacoustic waves incident from the second member 12 on the metal layer 10 is approximately 6.3%. In addition, in this case, the inventors confirmed by numerical calculation using an ultrasonic simulator ComWAVE that no mode conversion of the photoacoustic waves was caused upon transmission through the metal layer 10. In addition, in a case where as a material of the metal layer 10, Ag is used, it was confirmed by this numerical calculation that when a thickness of the metal layer 10 was 110 nm, refraction of the photoacoustic waves in the metal layer 10 was ignorable.

5. Supplementary Note

The present invention is not limited to the above-described embodiments, various modifications can be made within the scope described in the appended claims, and embodiments obtained by appropriately combining technical means disclosed in the above-described embodiments are also embraced within the technical scope of the present invention.

REFERENCE SIGNS LIST

1 Photoacoustic element
10 Metal layer
11 First member

12 Second member
2 Photoacoustic imaging device
21 Light source
22 Objective optical system
23 Acoustic wave detector

The invention claimed is:

1. A photoacoustic element comprising:
   a metal layer;
   a first member being bonded to one primary surface of the metal layer; and
   a second member being bonded to another primary surface of the metal layer, wherein
   each of the first member and the second member is configured by glass or a ceramics material whose density is equal to or greater than $2.6 \times 10^3$ kg/m$^3$,
   the metal layer reflects optical waves and transmits photoacoustic waves being emitted by an object which has absorbed the optical waves, and
   each of the first member and the second member is configured by glass or a ceramics material whose Poisson ratio is equal to or greater than 2.1.

2. The photoacoustic element according to claim 1, wherein
   one or both of the first member and the second member are configured by optical glass or ceramics.

3. The photoacoustic element according to claim 1, wherein
   the metal layer includes a main layer being configured by metal, and a thickness of a thinnest portion of the main layer is equal to or greater than 20 nm and equal to or less than 1,000 nm.

4. The photoacoustic element according to claim 3, wherein
   the metal layer includes, as an underlayer or underlayers, a metal layer or metal layers being formed on one primary surface or both primary surfaces of the main layer, a thickness of a thickest portion of the underlayer or each of the underlayers being equal to or less than 20 nm.

5. The photoacoustic element according to claim 3, wherein
   when a complex refraction index of the main layer is represented as $N_0$ and a complex refraction index of the first member or the second member is represented as $N_1$, Expression (1) given below is satisfied

[Expression 1]

$$\left(\frac{N_0 - N_1}{N_0 + N_1}\right)\left(\frac{N_0 - N_1}{N_0 + N_1}\right)^* > 0.7. \tag{1}$$

6. The photoacoustic element according to claim 3, wherein
   when a specific gravity of the main layer is represented as $\rho_0$, an acoustic velocity of longitudinal waves in the main layer is represented as $C_0$, a specific gravity of the first member is $\rho_1$, an acoustic velocity of longitudinal waves in the first member is represented as $C_1$, a specific gravity of the second member is represented as $\rho_2$, and an acoustic velocity of longitudinal waves in the second member is represented as $C_2$, Expressions (2) and (3) given below are satisfied

[Expression 2]

$$\frac{2\rho_1 C_1}{\rho_0 C_0 + \rho_1 C_1} < 0.5 \tag{2}$$

[Expression 3]

$$\frac{2\rho_2 C_2}{\rho_0 C_0 + \rho_2 C_2} < 0.5. \tag{3}$$

7. The photoacoustic element according to claim 3, wherein
   the main layer is configured by Al, Ag, Ti, Cu, Au, Pt, or an alloy containing at least any of these metals.

8. The photoacoustic element according to claim 3, wherein
   the main layer is configured by Al, and
   each of the first member and the second member is configured by glass or a ceramics material whose acoustic impedance is equal to or greater than $15 \times 10^6$ kg/m$^2$s and equal to or less than $19 \times 10^6$ kg/m$^2$s.

9. The photoacoustic element according to claim 3, wherein
   the main layer is configured by Ag, and
   each of the first member and the second member is configured by glass or a ceramics material whose acoustic impedance is equal to or greater than $25 \times 10^6$ kg/m$^2$s and equal to or less than $49 \times 10^6$ kg/m$^2$s.

10. The photoacoustic element according to claim 1, wherein
    one primary surface of the metal layer is made to be a concave surface in a parabolic surface shape.

11. The photoacoustic element according to claim 1, wherein
    the metal layer is configured by a first metal layer being formed on a surface of the first member and a second metal layer being formed on a surface of the second member, and
    a surface of the first metal layer on a side opposite to a side of the first member and a surface of the second metal layer on a side opposite to a side of the second member are thermally bonded, electric diffusion-bonded, atomic diffusion-bonded, surface activated bonded, or brazed.

12. A photoacoustic imaging device comprising:
    a light source;
    the photoacoustic element according to claim 1, which reflects optical waves being outputted from the light source and transmits photoacoustic waves being emitted by an object which has absorbed the optical waves; and
    an acoustic wave detector which detects the photoacoustic waves being transmitted through the photoacoustic element.

13. A method for manufacturing the photoacoustic element according to claim 1, the method comprising:
    a step of forming a first metal layer on a surface of the first member;
    a step of forming a second metal layer on a surface of the second member; and
    a step of thermal bonding, electric diffusion bonding, atomic diffusion bonding, surface activated bonding, or brazing a surface of the first metal layer on a side opposite to a side of the first member and a surface of the second metal layer on a side opposite to a side of the second member.

* * * * *